(12) United States Patent
Muraoka

(10) Patent No.: US 7,886,211 B2
(45) Date of Patent: Feb. 8, 2011

(54) MEMORY CONTROLLER

(75) Inventor: Hiroaki Muraoka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 979 days.

(21) Appl. No.: 11/696,341

(22) Filed: Apr. 4, 2007

(65) Prior Publication Data

US 2007/0237007 A1 Oct. 11, 2007

(30) Foreign Application Priority Data

Apr. 10, 2006 (JP) ............................. 2006-107914
Feb. 28, 2007 (JP) ............................. 2007-050626

(51) Int. Cl.
*G11C 29/00* (2006.01)

(52) U.S. Cl. ................ 714/763; 714/758; 370/471; 365/189.05

(58) Field of Classification Search ................ 714/701, 714/763, 758, 746, 781, 784, 785; 365/189.05; 370/471
See application file for complete search history.

(56) References Cited

U.S. PATENT DOCUMENTS 4,551,839 A * 11/1985 Botrel et al. ................ 714/751
6,286,123 B1 * 9/2001 Kim ........................... 714/781
6,310,884 B1 * 10/2001 Odenwald, Jr. ............. 370/412

FOREIGN PATENT DOCUMENTS

JP 2005-78378 3/2005

* cited by examiner

*Primary Examiner*—Guy J Lamarre
(74) *Attorney, Agent, or Firm*—Oblon, Spivak, McClelland, Maier & Neustadt, L.L.P.

(57) ABSTRACT

A memory controller includes a first calculation circuit configured to calculate an intermediate calculated value of an error correction code by using the head byte to a specified byte of a data in a process of calculating the error correction code for the data read from a memory, a data storage circuit configured to store the intermediate calculated value, a changing circuit configured to change data in a following part of the specified byte of the data, a second calculation circuit configured to calculate another error correction code by using the intermediate calculated value and the data in the following part including the changed data, and a data transferring circuit configured to transfer the changed data and the error correction code calculated in the second calculation circuit to the memory.

20 Claims, 3 Drawing Sheets

MEMORY CONTROLLER

CROSS REFERENCE TO RELATED APPLICATIONS

This application is based upon and claims the benefit of priority from the prior Japanese Patent Application No. 2006-107914 filed on Apr. 10, 2006 and prior Japanese Application No. 2007-50626 filed on Feb. 28, 2007; the entire contents of which are incorporated herein by reference.

BACKGROUND OF THE INVENTION

1. Field of the Invention

The present invention relates to a memory controller, and more specifically, to a memory controller having an error correction function.

2. Description of the Related Art

NAND type flash memory has been demanded more and more as it is used in the memory card. As the usage increasing, a memory card that operates at a faster speed with a more mass storage has been demanded. In order to respond to that demand, a NAND type flash memory using more fine processes has been developed. As it becomes finer, however, the capacity of the deleting unit of the NAND type flash memory called "block" (block size) has also increased.

In the NAND type flash memory that cannot overwrite data at the same physical address, data copy of the entire block including the memory region is required for rewriting a part of memory region. Therefore, increase of the block size increases a time required for data copy and slows down the writing speed of the memory as a result.

In order to cope with the problems, the modern NAND type flash memory has a page copy function (see, for example, Japanese Patent Laid Open No. 2005-78378). The page copy function is a function of specifying the copied-page address and page-to-be-copied address and performing data copy between blocks by page via a buffer (page buffer) included by the NAND type flash memory. Here, the term "page" is a unit of data smaller than a block. The data per page is called a page data. By using the page copy function, data copy between blocks is performed in the NAND type flash memory. Therefore, it is not needed to read out a data from the copied block to a host appliance or a memory controller and write the read data into a block-to-be-copied. That is to say, by using a page copy function, data copy between blocks in the NAND type flash memory can be speeded up.

Generally, if the NAND type flash memory is used, error correction is performed in consideration of data error due to deterioration of the memory cell or the like. For example, the memory controller examines whether data read from the NAND type flash memory has an error or not by an error examining function using the Read-Solomon code or the like. When the host appliance reads out a data and if the data has a correctable error, error correction is performed on the data and the corrected data is outputted from the memory controller to the host appliance. If data copy is performed between blocks, the data is read from the NAND type flash memory to the memory controller, and if the read data has a correctable error, error correction is performed and the corrected data is transferred from the memory controller to the NAND type flash memory. If error correction is not performed on the data, data that has been stored in the page buffer is written into the NAND type flash memory. That is to say, if data read from the NAND type flash memory has no error, data copy is performed between blocks via a page buffer without the page copy function transferring data from the memory controller to the NAND type flash memory. As a result, a data transferring time can be eliminated.

If the data read from the NAND type flash memory has no error, the management data stored in the redundant part other than the data part that stores the real data included in each page needs to be changed.

The NAND type flash memory has a function of rewriting only the changed part of the page buffer if a part of page data stored in the data part or the redundant part is changed. Accordingly, if only the changed data, for example, a management data is rewritten, a time required for rewriting data of the NAND type flash memory can be reduced. In the memory system configured to store the error correction code of the data in the redundant part, however, even if a part of page data is changed, page data needs to be read to the memory controller and changed, and the memory controller needs to calculate error correction codes from the head byte in order for the changed page data. Generally, a time for calculating the error correction code of the data is almost the same as a time for the memory controller to write data into the NAND type flash memory. That is to say, calculation of error correction code of the partially changed data needs about the same time as for rewriting all the data stored in the data part or the redundant part.

SUMMARY OF THE INVENTION

According to an aspect of the present invention, a memory controller connected to a memory, configured to read out a data stored in the memory and the first error correction code, and configured to change the read data, including: a first calculation circuit configured to calculate an intermediate calculated value of a second error correction code by using the head byte to a specified byte of the data in a process of calculating the second error correction code for the data; a data storage circuit configured to store the intermediate calculated value; a changing circuit configured to change data in a following part of the specified byte of the data; a second calculation circuit configured to calculate a third error correction code by using the intermediate calculated value and the data in the following part including the changed data; and a data transferring circuit configured to transfer the changed data and the third error correction code to the memory.

According to another aspect of the present invention, a memory controller connected to a memory, configured to read out a data stored in the memory and the first error correction code, and configured to change the read data, including: a first calculation circuit for calculating an intermediate calculated value of a second error correction code by using the head byte to a specified byte of the data in a process of calculating the second error correction code for the data; a data storage circuit configured to store the intermediate calculated value; a correction circuit configured to perform error correction on the data by using the first error correction code; a changing circuit configured to change data in a following part of the specified byte in the data from the correction circuit; a specifying circuit configured to transfer information on the specified byte; a second calculation circuit configured to calculate a third error correction code by using the intermediate calculated value to the specified byte notified from the specified circuit and the data in the following part including the changed data; and a data transferring circuit configured to transfer the changed data and the third error correction code to the memory.

According to another aspect of the present invention, a memory controller connected to a memory, configured to read out a data stored in the memory and the first error correction code, and configured to change the read data, including: a first calculation circuit configured to calculate an intermediate calculated value of a second error correction code by using the head byte to a specified byte set for each byte thereafter of the data in a process of calculating the second error correction code for the data; a data storage circuit configured to store a plurality of intermediate calculated values with each of the byte from the first calculation circuit as the specified byte; a correction circuit configured to perform error correction on the data by using the first error correction code; a changing circuit configured to change data in a following part of the specified byte in the data; a specifying circuit configured to transfer information on the specified byte; a second calculation circuit configured to calculate a third error correction code by using the intermediate calculated value to the specified byte notified from the specifying circuit and the data in the following part including the changed data; and a data transferring circuit configured to transfer the changed data and the third error correction code to the memory.

DETAILED DESCRIPTION OF THE PREFERRED EMBODIMENTS

Figure 1:
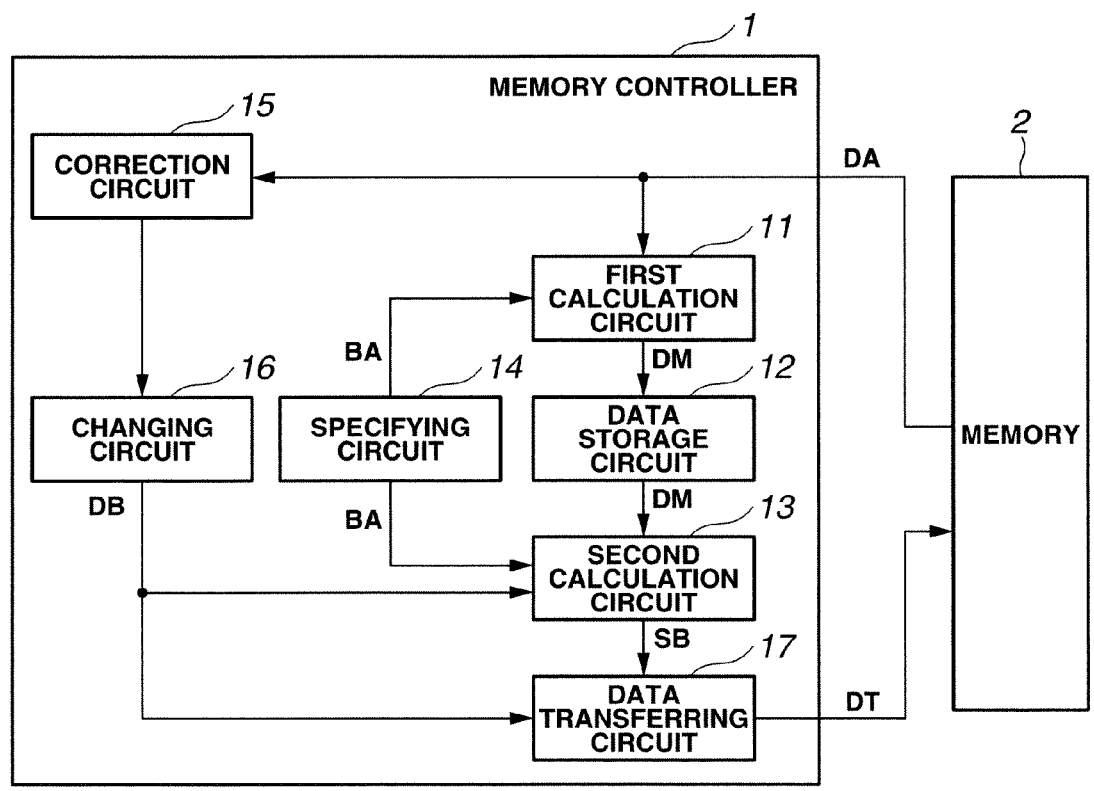
FIG. 1 is a block diagram showing a configuration of a memory controller according to an embodiment of the present invention.

With reference to the drawings, embodiments of the present invention will be described. In the description of the drawings below, the same or the similar reference characters are used for denoting the same or the similar parts.

Figure 2:
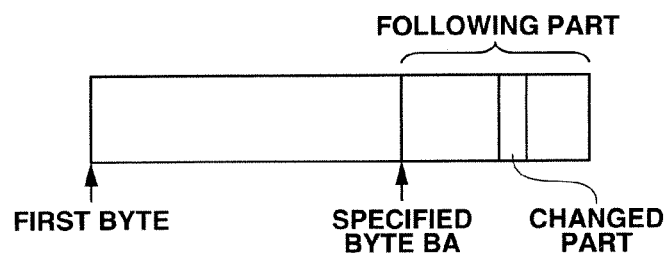
FIG. 2 is a pattern diagram showing a page configuration for illustrating a specified byte of a memory controlled by a memory controller according to an embodiment of the present invention.

FIG. 1 shows a configuration of a memory controller according to an embodiment of the present invention. FIG. 2 shows a page configuration of a memory.

A memory controller according to an embodiment of the present invention includes circuitry (15, 16) configured to change a data DA read from a memory 2, circuitry (11-14) configured to calculate an error correction code SB of a changed data DB based on the data DA read from the memory 2, and circuitry (17) configured to transfer the changed part of the data DB and the error correction code SB of the data DB to the memory 2. Since the memory controller transfers only the changed part of the data DB and the error correction coded SB of the data DB by the transferring operation at the circuitry (17), a time required for rewriting data to the memory 2 is shorter than that required for rewriting the data DA and the error correction code in the memory 2 by transferring all the data DB as a result of changing the data DA and its error correction code SB to the memory 2.

Other than the above-mentioned configuration, the embodiment realizes a configuration that enables a memory controller 1 to effectively calculate the error correction code when it calculates the error correction code to add to the changed page data if a part of the data (for example, page data) DA stored in the memory 2 is to be changed. The term "error correction code" in the description below means a parity code for an error correction that does not include a real data or a management data relating to the real data.

The memory controller 1 according to the embodiment of the present invention is a memory controller connected with the memory 2, configured to read out the data DA and its first error correction code stored in the memory 2, and configured to change the read data DA, as shown in FIG. 1. The memory controller 1 includes a first calculation circuit 11 configured to calculate an intermediate calculated value DM of a second error correction code SA by using from a head byte to a specified byte BA of the data DA in a process of calculating the second error correction code SA to the data DA, a changing circuit 16 configured to change the data in the following part to the specified byte BA in the data DA, a second calculation circuit 13 configured to calculate a third error correction code SB by using the intermediate calculated value DM and the data in the following part including the changed data, and a data transferring circuit 17 configured to transfer the changed data and the third error correction code SB to the memory 2. The term "following part" of the data DA means a part of the data DA read from the memory 2 after the specified byte BA in the time order.

FIG. 2 shows a page configuration for illustrating the specified byte of the memory 2.

As the specified byte BA, a byte read from the memory 2 prior to a part to be changed in the data DA is set. That is to say, as shown in FIG. 2, the specified byte BA is set so that the changed part of the data DA is included in the following part read from the memory 2 after the specified byte BA in the time order. Information on the specified byte BA is stored in a specifying circuit 14 shown in FIG. 1. The specifying circuit 14 transfers the information on the specified byte BA to the first calculation circuit 11 and the second calculation circuit 13. The memory controller 1 can be designed so that the information on the specified byte BA is inputted from the control part (not shown) outside of the memory controller 1 to the specifying circuit 14.

The fist calculation circuit 11 and the second calculation circuit 13 calculate an error correction code by using the data from the head byte in order. Specifically, the first calculation circuit 11 and the second calculation circuit 13 calculate an intermediate calculated value in any byte of the data with the intermediate calculated value in the byte immediately before the byte as an initial value by using the value of the byte and the initial value in order. That is to say, the intermediate calculated value DM is a parity code against the head byte to the specified byte BA of the data DA. The first error correction code is a parity code of the data DA read with the data DA from the memory 2 when data DA is read from the memory 2. The second error correction code SA is a parity code of the data DA newly calculated for the data DA read from the memory 2. The first calculation circuit 11 calculates the intermediate calculated value DM of the second error correction code from the head byte to the specified byte BA in the process of newly calculating the second error correction code SA for the data DA read from the memory 2. The calculated intermediate calculated value DM is used for calculating a third error correction code SB at the second calculation circuit 13 at the subsequent step, however, the second error correction code SA itself is not used in other circuit and the like. The first calculation circuit 11 and the second calculation circuit 13 calculate the error correction code calculated by using the data from the head byte in order, for example, such as a Read-Solomon code.

The memory controller 1 shown in FIG. 1 further includes a data storage circuit 12 and a correction circuit 15. The data storage circuit 12 stores the intermediate calculated value DM from the first calculation circuit 11. The correction circuit 15 performs error correction of the data DA by using the data DA read from the memory 2 and the parity code, which is the first error correction code.

The memory 2 is a memory that enables data copy between blocks by using a page copy function. The memory 2 has a function of rewriting only the changed part if a part of the stored data is changed. For the memory 2, the NAND type flash memory or the like can be employed.

Figure 3:
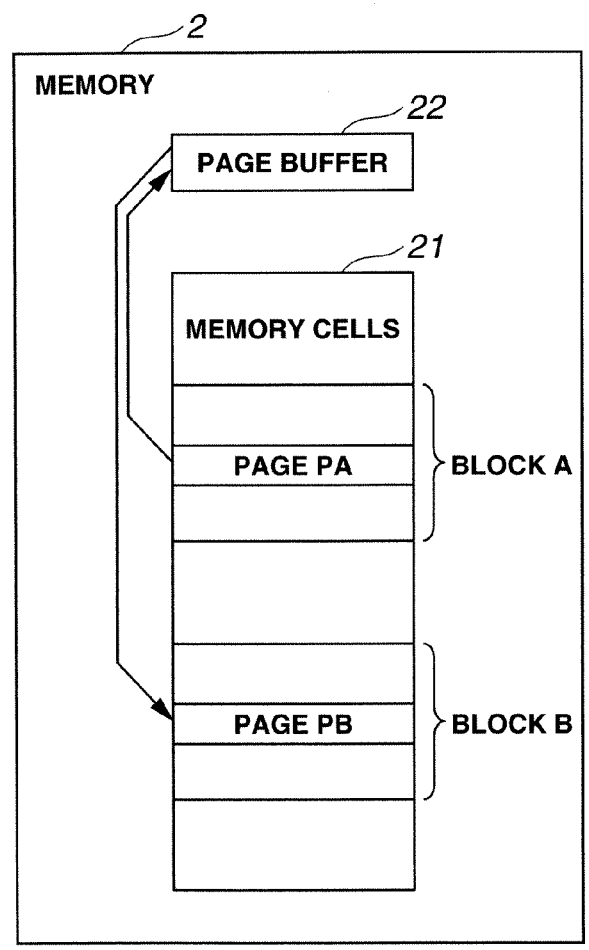
FIG. 3 is a pattern diagram showing an example of a configuration of a memory controlled by a memory controller according to an embodiment of the present invention.

FIG. 3 shows an exemplary configuration of the memory 2. The memory 2 includes memory cells 21 including a plurality of blocks and a page buffer 22. As mentioned above, the data stored in the memory 2 is erased by the unit of block. If data is copied between the blocks included in the memory cells 21, the data copy is performed by page using the page buffer 22. For example, the data read from a page PA included in a block A is stored in the page buffer 22. Then, the data stored in the page buffer 22 is written in a page PB included in a block B. In this manner, the data copy is performed. If a part of the data read from the page PA is changed, the data is once read out to the memory controller 1 by page, the data stored in the page buffer 22 is changed by the memory controller 1, and the changed data is written in the page PB. The memory controller 1 reads out the data stored in the page buffer 22 when it reads out data from the memory 2.

Figure 4:
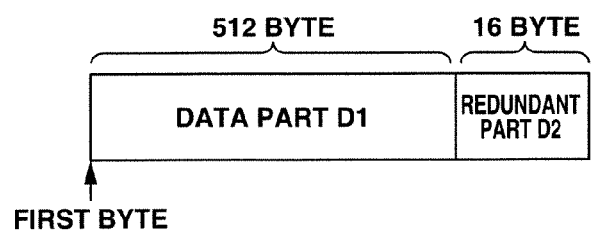
FIG. 4 is a pattern diagram showing an example of a page configuration of a memory controlled by a memory controller according to an embodiment of the present invention.

FIG. 4 shows an example of a page configuration of the memory 2. FIG. 4 corresponds to FIG. 2. In the example shown in FIG. 4, each page of the memory 2 has a data part D1 of 512 bytes and a redundant part D2 of 16 bytes. That is to say, the range from the first byte, which is the head byte, to the $512^{th}$ byte is the data part D1, and that from the $513^{th}$ byte to the $528^{th}$ byte is the redundant byte part D2. The real data is stored in the data part D1, and the management data relating to the real data stored in the data part D1 is stored in the redundant part D2. For the page configuration shown in FIG. 4, the data is read out from the head byte in the order of the data part D1 and then the redundant part D2. The parity code of each page is stored in the redundant part D2. The real data stored in the data part D1 and the management data stored in the redundant part D2 correspond to the data DA. The parity code for the data DA is stored at the end of the redundant part D2, for example. As an error correction code, an error correction code that can be calculated by using the data, from the head byte in order, for example, the Read-Solomon code can be used.

A method for controlling the data copy of the memory 2 by the memory controller 1 as shown in FIG. 1 will be described. Here, it is assumed that the memory 2 is the NAND type flash memory with a configuration shown in FIG. 3 and FIG. 4. A case where the management data stored in the redundant part D2 is changed when the data copy is performed between the blocks will be described as an example. That is to say, 512 bytes are set as the specific byte BA in the specifying circuit 14 so that the redundant part D2 is included in the following part of the page data (see FIG. 2). As an example of updating the management data when the data copy is done, a case where the number of data copy is stored in the redundant part, and the management data for recording the number of copy stored in the redundant part is count up each time the data is copied can be considered. The management data for recording the number of copy in the redundant part is not necessary for all the memory system. Some memory systems do not need it. For other reason, the management data may need to be changed as required.

The data DA stored in the page PA of the block A shown in FIG. 3 and its first error correction code are transferred to the page buffer 22. The first calculation circuit 11 shown in FIG. 1 calculates an intermediate calculated value DM of the second error correction code SA of the data DA, while reading out the data DA from the page buffer 22 and calculating the intermediate calculated value in each byte in the data DA. That is to say, the first calculation circuit 11 transfers the intermediate calculated value DM calculated by using from the head byte to the $512^{th}$ byte of the data DA and obtained in the process of calculating the second error correction code SA by referencing information on the specific byte BA transferred from the specifying circuit 14, to the data storage circuit 12. In other words, the intermediate calculated values DM to the $512^{th}$ byte are calculated with the intermediate calculated value calculated when the $511^{th}$ byte of the data DA is read as an initial value. The data storage circuit 12 stores the intermediate calculated value DM.

The data DA read from the memory 2 and the first error correction code thereof are transferred to the correction circuit 15. The correction circuit 15 performs error correction on the data DA by using the first error correction code if data DA has an error.

The changing circuit 16 changes at least a part of the data included in the following part of the specified byte BA in the data DA (including real data and management data) transferred from the correction circuit 15 (see FIG. 2). For example, the management data recording the number of the data copy of the data DA and stored in the redundant part D2 is updated. The result of the data DA changed by the changing circuit 16 is referred to as data DB below. Therefore, the data DB includes no parity code. The changing circuit 16 transfers the changed part of the data DB to the second calculation circuit 13 and the data transferring circuit 17.

The second calculating circuit 13 reads out the intermediate calculated value DM from the data storage circuit 12. The second calculation circuit 13 calculates the third error correction code SB as the error correction code of the data DB by using the intermediate calculated value DM by referring the information on the specified byte BA transferred from the specifying circuit 14. Specifically, the second calculation circuit 13 calculates the third error correction code SB by using the data after the $513^{th}$ byte of the data DB, the next byte of the specified byte BA with the intermediate calculated value as the initial value. Calculating the third error correction code SB with the intermediate calculated value DM as the initial value reduces a time for calculating the third error correction code SB shorter than in the case where the error correction code is calculated with all the data in the data DB. For example, if 1 clock cycle is needed for 1 byte to calculate an error correction code, the number of the clock cycle is reduced by 512 clock cycles to calculate the third error correction code SB by setting the specified byte BA to the $512^{th}$ byte. The second calculation circuit 13 transfers the third error correction code SB to the data transferring circuit 17. If it is detected that the data DA has an error at the correction circuit 15, the second calculation circuit 13 calculates the third error correction code SB by using the data DB from the head byte without using the intermediate calculated value DM under the control of the control part, not shown, (this is to be described later).

The data transferring circuit 17 transfers the information on the changed part of the data DA and the third error correction code SB to the memory 2 as a transferring data DT. For example, the management data that records the updated number of data copy and the third error correction code SB are transferred to the memory 2. Transferring only the changed part of the data DB from the memory controller 1 to the memory 2 can reduce the data transferring time shorter than in the case where all the data DB is transferred.

With a transferred data DT transferred to the memory 2, the data of a partly changed data DA stored in the page buffer as shown in FIG. 3, for example, the management data configured to record the number of the data copy in the data DA and the error correction code changed for the data DA (including the real data and the management data) are written in the page PB.

An example in which the management data included in the data DA is changed with the specified byte BA set to the $512^{th}$ byte has been described above. Increasing of a time required for calculating the third error correction code SB can also be restrained in the case where the real data stored in the data part D1 of the data DA is changed.

Here, a case where a memory 2 includes a bad memory cell is considered. The term "a bad memory cell" is a memory cell that may have a failure in the data storage function. The data stored in a bad memory cell has low reliability and high possibility to be subjected to error correction. Information of the bad memory cell can be obtained by the self check or the like of the memory 2 when the power is turned on to detect a bad memory cell. The information of the bad memory cell is notified from the memory 2 to the memory controller 1.

If the real data of the data DA read from the memory 2 includes the data that has been stored in the bad memory cell, error correction may be performed on the real data of the data DA. Then, based on the information on the bad memory cell notified from the memory 2, the specified byte BA is set to calculate the intermediate calculated value DM by using the data read from the memory 2 prior to the data stored in the bad memory cell in the time order. Setting the intermediate calculated value DM calculated by using the data that does not include the data stored in a bad memory cell to the initial value can shorten a time required for calculating the third error correction code SB.

In FIG. 1, the first calculation circuit 11 is a calculation circuit at the input side configured to input the data DA from the memory 2 and calculating the intermediate calculated value DM from the head byte to the specified byte in the process of calculating the second error correction code. The second calculation circuit 13 is a calculation circuit at the output side configured to receive the intermediate calculated value DM from the first calculation circuit 11 via the data storage circuit 12 and to efficiently calculate the third error correction code by using the intermediate calculated value DM and the data DB with partially changed (including the real data and the management data). Thus, the first calculation circuit 11, the data storage circuit 12 and the second calculation circuit 13 can be treated as a calculation circuit configured to calculate an error correction code of the partially changed data DB. In such a case, as the calculation circuit 11 and the second calculation circuit 13 have almost the same operation, and they do not operate at the same time, they can share most of the circuits.

The case where the memory 2 is the NAND type flash memory has been described above. The memory controller 1 according to the embodiment of the present invention can be applied to control of various memories with a function of changing a part of the stored data.

As described above, in the memory controller 1 according to the embodiment of the present invention, the intermediate calculated value DM of the second error correction code SA is calculated by using the data before the part to be changed. Then, the third error correction code SB is calculated for the partially changed data DB with the intermediate calculated value DM as the initial value. That is to say, for a partially changed data DB, an error correction code needs to be calculated only for the data after the specified byte BA in the calculation circuit at the output side. As a result, a time for calculating the third error correction code SB can be reduced shorter than in the case where an error correction code is calculated for all the data of the data DB.

The above description on the operation is such that the third error correction code can be efficiently calculated in a short time with the intermediate calculated value DM as an initial value in the second calculation circuit 13 at the later step if only the data from the head byte to the specified byte BA in the data DA read from the memory 2 has no error and the intermediate calculated value DM of the second error correction code calculated with the data from the head byte to the specified byte BA has reliability. If, however, an error is detected in the data from the head byte to the specified byte BA in the data DA read from the memory 2 (detected in the correction circuit 15), or if an uncorrectable error is found in the correction circuit 15, the intermediate calculated value DM of the second error correction code calculated in the first calculation circuit 11 has no reliability (i.e., the intermediate calculated value DM itself may have an error) so that the intermediate calculated value DM cannot be used in the second calculation circuit 13. Then, if an error is detected in the data from the head byte to the specified byte BA in the data DA in the correction circuit 15 or if uncorrectable error is found in the correction circuit 15, the control part, not shown, receives information from the correction circuit 15 and stops the using of the intermediate calculated value DM in the second calculation circuit 13, while controlling the specifying circuit 14 to stop the operation of the specifying circuit 14 to specify bytes to the second calculation circuit 13. With the operation of the byte specification stopped, the third error correction code SB is calculated as the second calculation circuit 13 calculates error correction codes from the head byte to the last byte in order for the data DB from the changing circuit 16. The data transferring circuit 17 transfers the third error correction code SB and the changed part of the data DB to the memory 2 as the transferring data DT.

<Modification>

Figure 5:
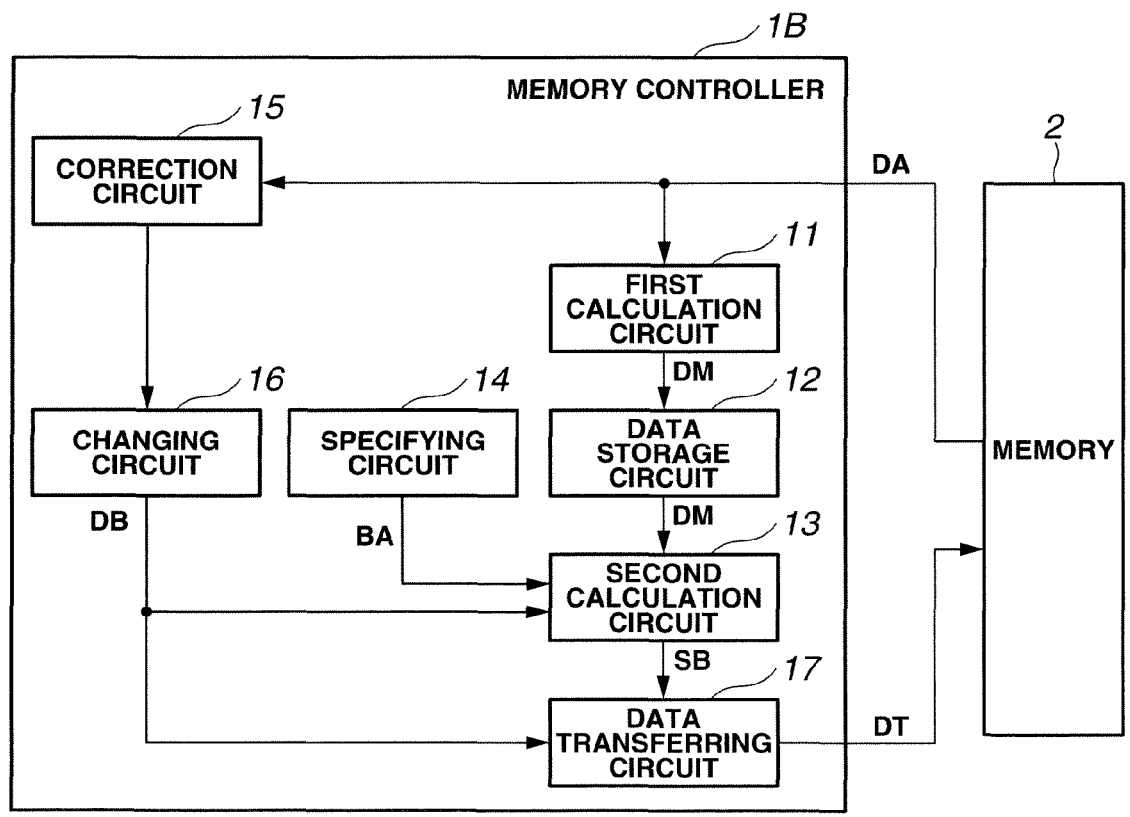
FIG. 5 is a block diagram showing a configuration of a memory controller according to a modification of an embodiment of the present invention.

FIG. 5 shows a memory controller 1B according to a modification of an embodiment of the present invention. The memory controller 1B shown in FIG. 5 is adapted such that the specified byte BA is not transferred from the specifying circuit 14 to the first calculation circuit 11. In the memory controller 1 shown in FIG. 1, the intermediate calculated value DM calculated with the data from the head byte of the data DA to a preset specified byte BA is stored in the data storage circuit 12. In contrast, in the memory controller 1B, the intermediate calculated values DM from the head byte to each byte thereafter (including the head byte) of the data DA that is obtained in the process of calculating the second error correction code SA are respectively transferred from the first calculation circuit 11 to the data storage circuit 12. As the result, the data storage circuit 12 stores the intermediate calculated values DM by the number of the bytes of the data DA.

That is to say, a plurality of intermediate calculated values DM with each byte of the data DA being the specified byte BA are stored in the data storage circuit 12. The other configuration is the same as that of the first embodiment shown in FIG. 1.

By storing the intermediate calculated values DM to each byte of the data DA in the data storage circuit 12 shown in FIG. 5, the third error correction code SB can be calculated by using the intermediate calculated values DM to specified byte BA arbitrarily specified. Specifically, the second calculation circuit 13 reads out from the data storage circuit 12 the intermediate calculated value DM to the specified byte BA noticed from the specifying circuit 14. The second calculation circuit 13 calculates the third error correction code SB by using the intermediate calculated value DM read from the data storage circuit 12 and the data in the following part of the specified byte BA of the data DB. A random access memory (RAM) and the like, for example, can be used for the data storage circuit 12.

In the memory controller 1B shown in FIG. 5, the intermediate calculated values DM in each byte of the data DA are respectively stored in the data storage circuit 12. Then, the third error correction code SB of the data DB is calculated as an initial value of the intermediate calculated value DM of any byte of the data DB. Thus, in the memory controller 1B shown in FIG. 5, a time for calculating error correction codes from the head byte to any byte of the data DB can be eliminated.

Although an example in which the specifying circuit 14 stores the information of the specified byte BA is taken in the description of the embodiments, the first calculation circuit 11 and the second calculation circuit 13 may store information of the specified byte BA respectively.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A memory controller connected to a memory, configured to read out a data stored in the memory and a first error correction code thereof, and configured to change said read data, comprising:
    a first calculation circuit configured to calculate an intermediate calculated value of a second error correction code by using a head byte to a specified byte of the data in a process of calculating the second error correction code for the data;
    a data storage circuit configured to store said intermediate calculated value;
    a changing circuit configured to change data in a following part of said specified byte of said data;
    a second calculation circuit configured to calculate a third error correction code by using said intermediate calculated value and said data in the following part including said changed data; and
    a data transferring circuit configured to transfer said changed data and said third error correction code.

2. The memory controller according to claim 1, further comprising a correction circuit configured to perform error correction on said data by using said first error correction code.

3. The memory controller according to claim 2, wherein said memory comprises memory cells and a page buffer, and a function of enabling to copy data between blocks and performing said data copy by page by using said page buffer, and
    wherein said memory controller has a function of reading out data stored in a first page of a first block in said memory to the memory controller and changing the read data and writing the changed data into the second page of the second block in said memory.

4. The memory controller according to claim 3, wherein the data read from said memory comprises a real data and a management data relating to the real data, and
    wherein said data to be changed is said management data.

5. The memory controller according to claim 4, wherein said management data is the number of data copy.

6. The memory controller according to claim 2, wherein the data read from said memory comprises a real data and a management data relating to the real data, and
    wherein said data to be changed is said management data.

7. The memory controller according to claim 6, wherein said management data is the number of data copy.

8. The memory controller according to claim 2, wherein said specified byte is set to calculate an intermediate calculated value of said second error correction code by using data read from said memory prior to data stored in a bad memory cell if the data read from said memory includes the data that has been stored in the bad memory cell.

9. The memory controller according to claim 1, wherein said memory comprises memory cells and a page buffer, and a function of enabling to copy data between blocks and performing said data copy by page by using said page buffer, and
    wherein said memory controller has a function of reading out data stored in a first page of a first block in said memory to the memory controller and changing the read data and writing the changed data into a second page of a second block in said memory.

10. The memory controller according to claim 9, wherein the data read from said memory comprises a real data and a management data relating to the real data, and
    wherein said data to be changed is said management data.

11. The memory controller according to claim 10, wherein said management data is the number of data copy.

12. The memory controller according to claim 1, wherein the data read from said memory comprises a real data and a management data relating to the real data, and
    wherein said data to be changed is said management data.

13. The memory controller according to claim 12, wherein said management data is the number of data copy.

14. The memory controller according to claim 1, wherein said specified byte is set to calculate an intermediate calculated value of said second error correction code by using data read from said memory prior to data stored in a bad memory cell if the data read from said memory includes the data that has been stored in the bad memory cell.

15. A memory controller connected to a memory, configured to read out a data stored in the memory and a first error correction code thereof, and configured to change said read data, comprising:
    a first calculation circuit configured to calculate an intermediate calculated value of a second error correction code by using a head byte to a specified byte of the data in a process of calculating the second error correction code for the data;
    a data storage circuit configured to store said intermediate calculated value;
    a correction circuit configured to perform error correction on said data by using said first error correction code;
    a changing circuit configured to change data in a following part of said specified byte in the data from said correction circuit;
    a specifying circuit configured to transfer information on said specified byte;
    a second calculation circuit configured to calculate a third error correction code by using said intermediate calculated value to said specified byte notified from said specifying circuit and said data of the following part including said changed data; and a data transferring circuit configured to transfer said changed data and said third error correction code to said memory.

16. The memory controller according to claim 15, wherein said specified byte is set to calculate an intermediate calculated value of said second error correction code by using data read from said memory prior to data stored in a bad memory cell if the data read from said memory includes the data that has been stored in the bad memory cell.

17. The memory controller according to claim 15, wherein, if an error is detected in the data from the head byte to the specified byte in said data read from said memory in said correction circuit, or if uncorrectable error is found in said error correction circuit, said second calculation circuit calculates error correction codes from the head byte to the last byte for the data from said changing circuit in order to calculate third error correction code by stopping the using of the intermediate calculated value in said second calculation circuit based on information from said correction circuit.

18. A memory controller connected to a memory, configured to read out a data stored in the memory and a first error correction code thereof, and configured to change said read data, comprising:

a first calculation circuit configured to calculate an intermediate calculated value of a second error correction code by using a head byte to a specified byte set for each byte thereafter of the data in a process of calculating a second error correction code for the data in order;

a data storage circuit configured to store a plurality of intermediate calculated values with each of said byte from said first calculation circuit as the specified byte;

a correction circuit configured to perform error correction on said data by using said first error correction code;

a changing circuit configured to change data in a following part of said specified byte in said data;

a specifying circuit configured to transfer information on said specified byte;

a second calculation circuit configured to calculate a third error correction code by using said intermediate calculated value to said specified byte notified from said specifying circuit and said data in the following part including said changed data; and a data transferring circuit configured to transfer said changed data and said third error correction code to said memory.

19. The memory controller according to claim 18, wherein said specified byte is set to calculate an intermediate calculated value of said second error correction code by using data read from said memory prior to data stored in a bad memory cell if the data read from said memory includes the data that has been stored in the bad memory cell.

20. The memory controller according to claim 18, wherein, if an error is detected in the data from the head byte to the specified byte in said data read from said memory in said correction circuit, or if uncorrectable error is found in said error correction circuit, said second calculation circuit calculates error correction codes from the head byte to the last byte for the data from said changing circuit in order to calculate third error correction code by stopping the using of the intermediate calculated value in said second calculation circuit based on information from said correction circuit.

* * * * *